INVENTOR.
Joseph W. Gratian
BY
T. L. Bowes
Att'y

Sept. 16, 1952 J. W. GRATIAN 2,611,084
ELECTRONIC WAVE CHOPPING CIRCUITS
Filed March 10, 1950 4 Sheets-Sheet 3

INVENTOR.
Joseph W. Gratian
BY J. L. Bowes
Att'y

Patented Sept. 16, 1952

2,611,084

UNITED STATES PATENT OFFICE 2,611,084

ELECTRONIC WAVE CHOPPING CIRCUITS

Joseph W. Gratian, Rochester, N. Y., assignor to Stromberg-Carlson Company, a corporation of New York Application March 10, 1950, Serial No. 148,927

21 Claims. (Cl. 250—27)

The present invention relates to electronic circuits and, more particularly, to electronic circuits suitable for selecting, or chopping out, a desired portion of a continuous periodic electric wave, which selected portion may then be utilized in any desired manner. While the invention is of general utility, it is particularly suitable for use in investigating the frequency and transient response of electrical apparatus, especially in connection with magnetic recording equipment arranged to translate relatively low frequency phenomena.

In many instances it is desirable to separate, or chop out, a portion of a continuous periodic wave and to utilize the chopped out portion to investigate the response thereto of various kinds of electrical equipment. Such a situation is found, for example, in apparatus arranged to amplify and translate a speech wave train which has been modified by multiplexing equipment or secrecy equipment in such a manner that certain portions of the wave train are omitted. It is then necessary to ascertain the response of such apparatus to simulated signals such as chopped or garbled speech. Again, the chopped out portion of the wave may be utilized to investigate the transient response of amplifying equipment arranged to amplify a continuous sinusoidal wave and wherein it is necessary to examine the behavior of equipment when subjected to a single cycle of the sinusoidal wave and to ascertain the effect of the equipment upon the relatively abrupt end portions of the selected cycle.

It is desirable in testing arrangements of the above-described type to provide a wave selecting or chopping circuit which may select a single cycle of a continuous sinusoidal wave, alternate cycles thereof, or every $n$th cycle of the period wave. Accordingly, it is the primary object of the present invention to provide a new and improved electronic wave chopping circuit of versatile character which is suitable for use in testing the response characteristics of electrical equipment.

It is a further object of the invention to provide a new and improved electronic wave chopping circuit wherein a single cycle of a continuous periodic wave may be selected for use in testing amplifying apparatus or the like.

It is another object of the invention to provide a new and improved electronic wave chopping circuit which is arranged to derive from a continuous periodic wave, a test signal comprising a single cycle of the continuous periodic wave, and wherein means are provided for maintaining the base line of the test signal substantially undisturbed between the selected cycles.

It is still another object of the invention to provide a new and improved electronic wave chopping circuit adapted to be energized by a continuous periodic wave and arranged to provide a test signal comprising a single cycle, successive alternate cycles, or every $n$th cycle of said period wave and wherein means are provided for reducing transients occurring at the end portions of said selected cycles to permit examination of the effect of apparatus supplied with the test signal upon said end portions.

The invention, both as to its organization and method of operation, together with further objects and advantages thereof, will best be understood by reference to the following specification taken in connection with the accompanying drawings in which.

Figure 1:
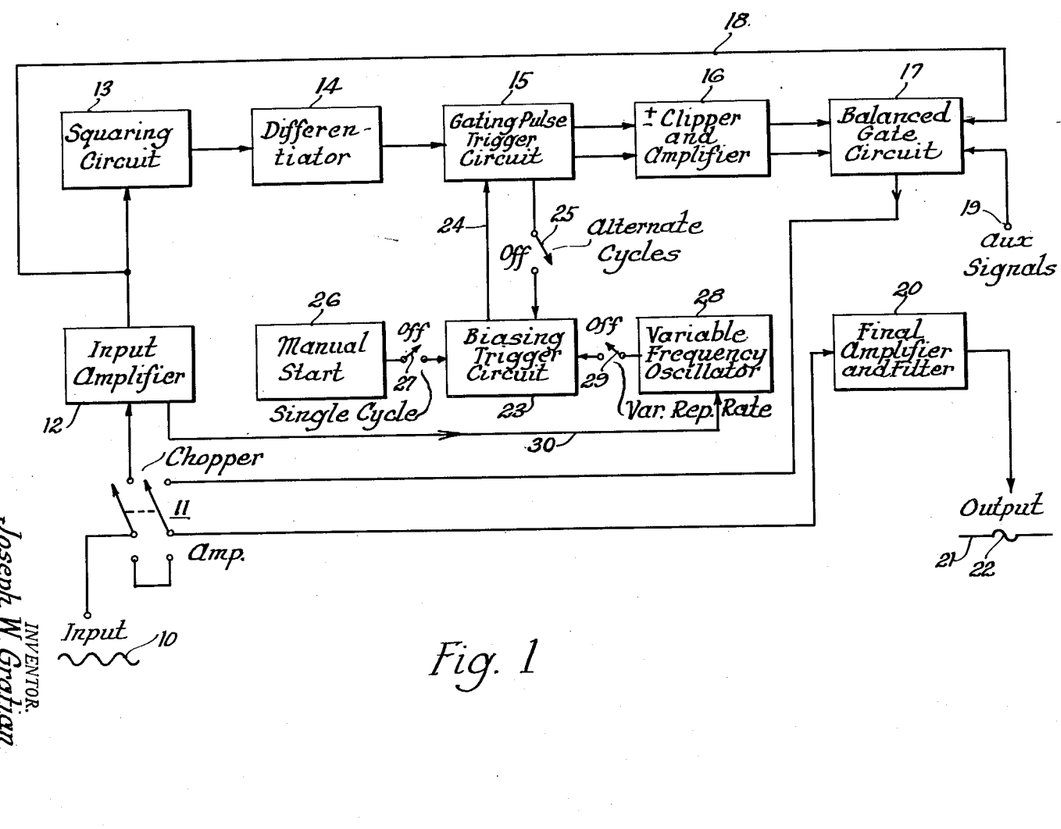
Fig. 1 is a schematic diagram in block diagram form of an electronic wave chopping circuit embodying the principles of my invention.

Referring now to the drawings there is illustrated in Fig. 1, in block diagram form, an electronic wave chopping circuit constructed in accordance with the principles of my invention. The electrical wave, a portion of which is to be separated, or chopped out, for test purposes, is illustrated as the continuous sinusoidal wave 10 which is connected through a selector switch indicated generally at 11 to an input amplifier 12. The output of the input amplifier is connected to a squaring circuit 13 to the output of which are connected in cascade relation in the order named a differentiating circuit 14, a gating pulse trigger circuit 15, a balanced clipper and amplifier 16 and a balanced gate circuit 17. The output of the input amplifier 12 is also connected through a lead 18 to an input circuit of the balanced gate circuit 17. Auxiliary signals suitable for testing the electrical equipment may be introduced at input terminal 19 to another input section of the balanced gate circuit 17. The output of the balanced gate circuit 17 is selectively connected by means of the switch 11 to a final amplifier and filter 20, the output of which supplies a suitable test signal to the apparatus under examination. For example, the test signal may comprise a substantially undisturbed base line 21 on which is superimposed a single selected cycle 22 of the continuous sinusoidal input wave 10.

To condition the gating pulse trigger circuit 15 for control by the continuous input wave, there is provided a biasing trigger circuit 23, the output of which is connected to the gating pulse trigger circuit by means of lead 24. A feed back connection from the gating pulse trigger circuit 15 to the biasing trigger circuit 23 is made through a selector switch 25. The biasing trigger circuit 23 may be initiated manually by a starting circuit 26 which is connected to the biasing trigger circuit 23 through a selector switch 27. Alternatively, operation of the biasing trigger circuit may be initiated at a variable frequency rate by means of a variable frequency oscillator 28 which is operated at a frequency lower than that of the incoming wave 10 and is connected to the biasing trigger circuit through a selector switch 29. The signal output of the input amplifier 12 is connected to the variable frequency oscillator 28 through a lead 30 so as to synchronize the operation of this oscillator with the incoming continuous wave.

Referring briefly to the operation of the above described electronic wave chopping system as a whole, the continuous input wave 10 is supplied to the input amplifier wherein it is amplified to a sufficient degree to provide proper operation for the squaring circuit 13. The squaring circuit 13 is utilized to derive from the continuous input wave 10 a rectangular shaped wave having the same frequency as the input wave and having relatively steep sloped sides. Differentiation of the output of the squaring circuit in differentiator 14 produces control pulses, alternate ones of which are of opposite polarity, these control pulses corresponding in time to the leading and trailing edges of the rectangular wave produced at the output terminals of the squaring circuit 13. The gating pulse trigger circuit 15 is of the general type referred to as a flip-flop circuit in which a pair of electron discharge devices are arranged to be switched abruptly from a conductive to a non-conductive state, or vice versa, in response to a first one of the control pulses from the differentiator 14 and to be returned to their original state by the next succeeding control pulse of the same polarity. There is thus produced at the output terminals of the gating pulse trigger circuit 15 positive and negative going gating pulses the duration of which corresponds in time to a single cycle of the input wave, 10. The oppositely sensed gating pulses produced in the output circuit of the gating pulse circuit 15 are supplied to the clipper and amplifier 16 wherein the leading and trailing edges of the gating pulses are substantially sharpened. The gating pulses are then supplied to the balanced gate circuit 17 wherein they are utilized to switch on one section of the gate circuit while simultaneously switching off the other section thereof so that each section is switched on and off in accordance with the gating pulses. The input wave 10 is supplied to one section of the gate circuit and the sections of the gating circuit are so adjusted that no portion of the gating pulses appears in the output circuit of the gating circuit 17 and only that portion of the continuous input wave 10 which occurs between the leading and trailing edges of the gating pulses appears in the output of the balanced gate circuit 17. The output of the gate circuit 17 is applied to the final amplifier and filter 20 wherein switching transients which occur during the leading and trailing edge intervals of the gating pulses are removed by filtering action and the selected cycle of the input wave amplified to suitable proportions for use in testing the particular electrical equipment.

The selector switch 11 is utilized to supply either the test signal comprising selected portions of the input wave, or the input wave itself, to the final amplifier and hence to the equipment under test. By such an arrangement, a comparison can be made of the response of the equipment under test to the continuous input wave and to the chopped out portions thereof. In addition, the selector switch 11, when connected to supply the input wave directly to the final amplifier and filter 20, provides a ready means for checking the frequency response of the particular section of the filter employed, as will be more readily apparent from a consideration of the filter circuit in more detail hereinafter.

In the arrangement described thus far, it has been assumed that the gating pulse trigger circuit is turned on and off by successive control pulses from the differentiator 14 so that every other cycle of the input wave 10 is passed by the balanced gate circuit 17 to the final amplifier and filter 20. However, in order to select a single cycle of the input wave, the biasing trigger circuit 23 is arranged to control the bias voltage supplied to the gating pulse trigger circuit 15 so as normally to disable the circuit 15 and to prevent actuation thereof by the control pulses from the differentiator 14. The biasing trigger circuit is arranged to be turned on by the manual start circuit 26 or by the variable frequency oscillator 28 so that the bias voltage to the gating pulse trigger circuit is changed to permit actuation thereof by the next succeeding control pulse. The bias trigger circuit is turned off by means of a feed back connection from the gating pulse trigger circuit 15 to the bias trigger circuit, the bias trigger circuit remaining in the off condition until subsequent enerization thereof by either of the sources 26 or 28.

With such an arrangement a wide variety of test signals may be obtained from the incoming wave. For example, with the selector switch 25 closed, closure of the switch 27 causes the biasing trigger circuit 23 to supply enabling bias to the gating pulse trigger circuit, the control pulse immediately following closure of the switch 27 turning on the gating pulse generating trigger circuit and the next succeeding control pulse turning off the circuit 15. Turning off the circuit 15 also produces a feed back pulse for turning off the biasing trigger circuit. There is thus produced in the output of the final amplifier a single cycle of the input wave 10.

In the event that alternate cycles of the input wave are to be supplied to the equipment under test, the switch 25 is opened and upon closure of switch 27 the gating pulse trigger circuit 15 continues to be turned on and off at a frequency equal to one-half that of the input wave so that alternate cycles of the incoming wave are selected for test purposes.

If several cycles are to be omitted, for example, if every fifth cycle is to be selected, the switch 27 may be opened and switches 25 and 29 closed so that the biasing trigger circuit is turned on at the repetition rate of the variable frequency oscillator 28. The biasing trigger circuit is again turned off after each pair of active control pulses in a manner similar to that described in connection with the single cycle operation.

Figure 2:
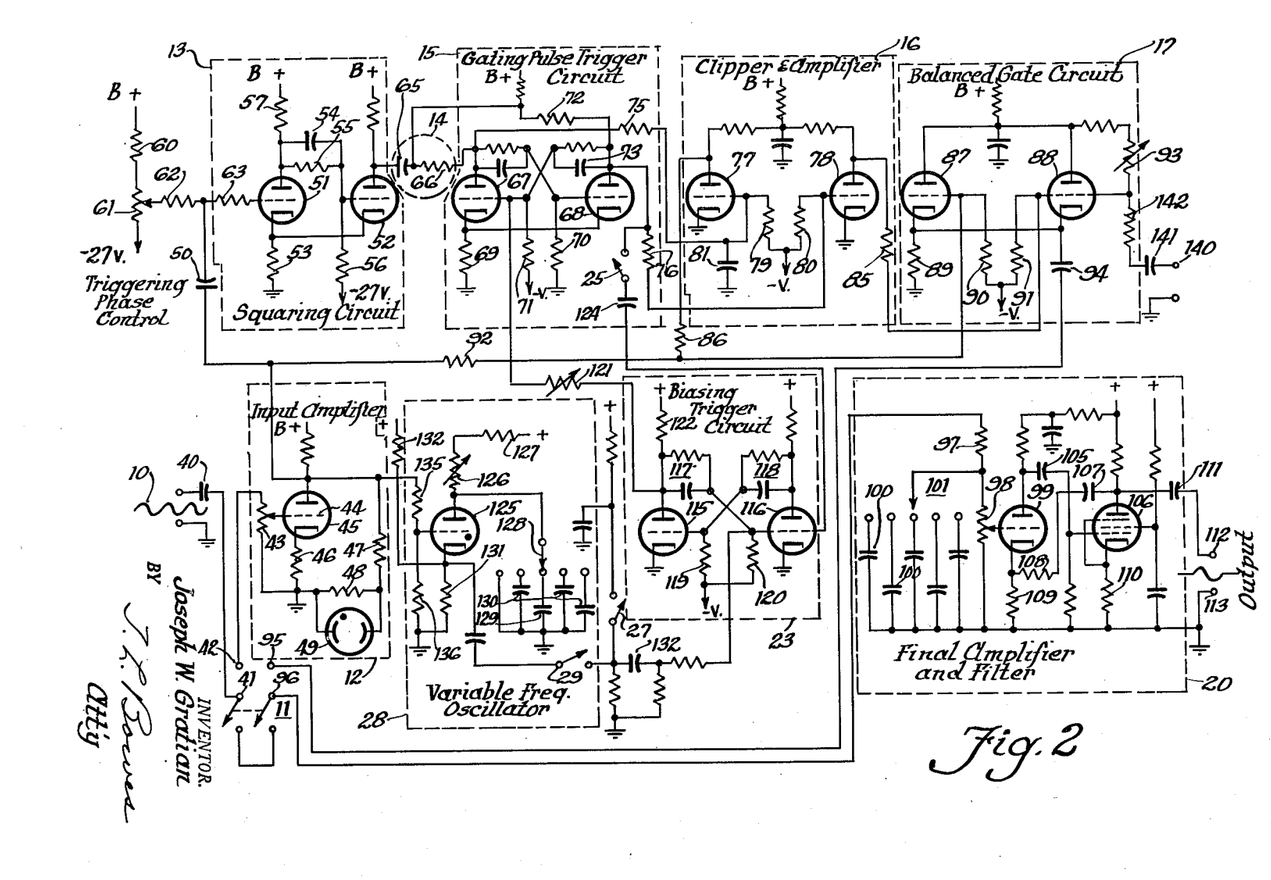
Fig. 2 is a schematic diagram of the block diagram of Fig. 1.

In considering specific embodiments of the circuits indicated in block diagram form in Fig. 1, reference is now made to Fig. 2 wherein there is shown schematically a specific circuit arrangement suitable to provide the above-described operations. Referring to Fig. 2, the continuous input wave 10, which is conveniently illustrated as a sinusoidal wave, is applied through a capacitor 40 to one arm 41 of the double pole-double throw selector switch 11. In the test signal generating position of switch 11, the arm 41 is connected to the contact 42, which contact is connected through an input potentiometer 43 to ground potential. The arm of the potentiometer 43 is connected to the control electrode 44 of an electron discharge device 45. In order to provide linear amplification of the input wave 10 in the device 45, there is provided an unby-passed cathode resistor 46 which is connected between the cathode of the device 45 and ground. The amplified input wave, which appears at the anode of the device 45, is coupled to the input circuit of the squaring circuit 13 through a coupling capacitor 50.

In order to determine that sufficient voltage is produced in the anode circuit of the device 45 to operate the squaring circuit, means are provided for indicating the amplitude of voltage appearing at the anode of device 45. In the illustrated embodiment this indicator arrangement comprises resistors 47, 48, which are connected in series between the anode of device 45 and ground, and a neon tube 49 which is connected across the lowermost resistor 48. The values of resistors 47 and 48 are so chosen that the neon tube 49 will conduct when the voltage at the anode of device 45 exceeds the minimum requirements of the squaring circuit 13. Thus, by adjustment of the potentiometer 43 the proper voltage level for the squaring circuit may be provided.

The squaring circuit 13 may comprise any suitable circuit arrangement for deriving a rectangular shaped wave from the continuous sinusoidal input wave. However, to provide a rectangular wave having relatively steep sloped sides, I prefer to employ a circuit commonly known as a Schmitt trigger circuit, which is capable of producing a relatively steep sided rectangular wave when excited by the amplified sinusoidal input voltage. As illustrated, this squaring circuit comprises a pair of electron discharge devices 51, 52 the cathodes of which are connected through a common cathode resistor 53 to ground potential. The anode of the device 51 is connected through a coupling network comprising a parallel connected capacitor 54 and resistor 55 to the control electrode of the device 52. The control electrode of the device 52 is also connected through a resistor 56 to the negative terminal of a unidirectional source of potential. The anode of the device 51 is connected through a load resistor 57 to the positive terminal of a unidirectional source of potential, illustrated by the symbol B+. The values of resistors 55, 56 and 57 are so chosen that the control electrode of device 52 normally holds that device in a conductive state. Device 52 thus furnishes sufficient bias across resistor 53 to cause the device 51 normally to be held in a non-conductive condition. The positive going portion of the amplified input wave, which is supplied to the electrode of device 51, causes the device 51 to conduct and due to the common cathode connection of the two devices there is an abrupt change, or switching action, in which the device 52 is turned off and the device 51 turned on. The capacitor 54, which is preferably of relatively small capacity, operates to by-pass the resistor 55 at high frequencies so that the switching action takes place in a very short period of time and there is produced in the anode circuit of the device 52 a rectangular shaped wave having relatively steep sloped leading and trailing edges and having a frequency equal to that of the incoming wave.

In order to establish phase coincidence between the rectangular wave produced at the output terminals of the squaring circuit 13 and the desired portion of the input wave, there is provided means for adjusting the phase of the produced rectangular wave with respect to the sinusoidal input wave. In the illustrated embodiment, a bleeder network is provided for this purpose which comprises a resistor 60 and a potentiometer 61. These circuit elements are connected in series between the positive and negative sources of potential. The arm of the potentiometer is connected through a pair of resistors 62 and 63 to the control electrode of the device 51. With this arrangement, the fixed bias on the control electrode of the device 51 may be varied so as to vary the point in the cycle of the amplified input wave at which switching of the devices 51 and 52 occurs.

To provide control pulses which coincide with the leading and trailing edges of the rectangular output from the squaring circuit 13, there is provided means for differentiating the rectangular wave to obtain sharp control pulses, successive ones of which are of opposite polarity. Specifically, the differentiation of the rectangular wave is accomplished by means of a differentiating circuit which includes a capacitor 65 and the total impedance from the right hand side of the capacitor 65 to ground. This total impedance includes the common anode resistor for the tubes 67 and 68 in parallel with the series combinations of the resistors 66 and 72 and the tube resistances respectively associated therewith to ground.

While the gating pulse trigger circuit may comprise any suitable circuit arrangement for producing gating pulses in response to the differentiated control pulses, I prefer to employ a flip-flop circuit, commonly known as an Eccles-Jordan trigger circuit, this circuit being modified in a manner to be described hereinafter to provide proper operation with the biasing trigger circuit. In the specific embodiment illustrated in Fig. 2, the modified Eccles-Jordan circuit comprises a pair of electron discharge devices 67, 68 the cathodes of which are connected through a common cathode resistor 69 to ground potential. The anode of each of the devices 67 and 68 is cross-connected through a conventional RC network to the control electrode of the opposite device. Further, the control electrode of the device 68 is connected to ground potential through a resistor 70 and the control electrode of device 67 is connected to a negative potential source through a resistor 71.

By appropriate choice of the bleeder networks between positive and negative sources of potential associated with each control electrode, the device 68 is normally held in a conductive state, and the device 67 is normally held in a non-conductive state as will be readily apparent to those skilled in the art. With this arrangement, the gating pulse trigger circuit is turned on and off by successive negative pulses and the circuit is not responsive to control pulses of positive polarity. Thus, positive control pulses supplied from the differentiating circuit to the anode of device 67 are coupled to the control electrode of device 68, but produce no change therein inasmuch as this device is normally conducting. The positive control pulses supplied to the anode of the device 68 through its load resistor 72 are also supplied through the RC network 73 to the control electrode of the device 67. However, the device 67 is normally held non-conductive by an amount sufficient to prevent conduction thereof in response to the positive control pulses.

Inasmuch as the devices of the trigger circuit 15 are simultaneously switched from a conductive to a non-conductive condition, there is produced in the anode circuit of these devices gating pulses of opposite polarity, the leading and trailing edges of these pulses coinciding respectively in time with a first, active, negative control pulse and the next succeeding negative control pulse. These oppositely sensed gating pulses are directly impressed through isolating resistors 75, 76 upon the clipper-amplifier circuit 16 wherein they are squared up so as to decrease the leading and trailing edge intervals thereof and equalize the same so as to reduce switching transients produced in the balanced gating circuit 17. The isolating resistors 75, 76 are connected to the control electrodes of a pair of electron discharge devices 77, 78. The control electrodes of the devices 77, 78 are also connected through grid bias resistors 79, 80 to a negative source of unidirectional potential. The devices 77, 78 are utilized to provide amplification for the oppositely sensed gating pulses from the trigger circuit 15. Due to the fact that the control electrode circuits of devices 77, 78 are operated at a substantial negative potential the gating pulses are clipped off so as to provide in the anode circuits of devices 77, 78 gating pulses which are of substantially steeper slope and more uniform amplitude than those originally produced in the anode circuits of circuit 15.

The clipper amplifier 16 has the important additional function of removing the positive control pulses which are superimposed on the gating pulses produced by the gating pulse trigger circuit 15. In this connection, it will be recalled that while the positive pulses from differentiator 14 do not actuate the trigger circuit 15, they nevertheless pass through the circuit 15 to the input circuit of the clipper amplifier 16. This is readily apparent when it is realized that those positive pulses are supplied to the anode circuits of devices 67 and 68 through the resistors 66 and 72 and thence to the input circuits of the devices 77 and 78 regardless of the operation of trigger circuit 15. However, the undesired positive pulses are removed in the clipper amplifier 16 so that symmetrical gating pulses in amplified form are provided in the output circuit of clipper amplifier 16. With regard to the clipping action of the circuit 16, it will be understood that the undesired positive pulse superimposed on the positively sensed gating pulse supplied to device 78 is ineffective to change the current in the anode circuit of device 78 inasmuch as the device 78 is already drawing maximum current. Hence the superimposed pulse does not appear in the anode circuit of device 78. The undesired positive pulse supplied to device 77 is removed by grid clipping in the opposite direction as will be readily apparent to those skilled in the art.

The steep sided gating pulses produced in the anode circuits of the clipper-amplifier are supplied to the balanced gate circuit 17 to control selection of the desired portion of the periodic input wave. Thus these pulses are directly supplied from the anodes of the devices 77 and 78 through the isolating resistors 85, 86 to the control electrodes of electron discharge devices 87, 88. The cathodes of the devices 87, 88 are connected through a common cathode resistor 89 to ground. The control electrodes of the devices 87, 88 are connected through grid biasing resistors 90, 91 to a negative source of unidirectional potential. Isolating resistors 85, 86 and grid bias resistors 90, 91 are all preferably of the same value so as to allow introduction of the gating pulses to the control electrode circuits of the devices 87, 88 without interacting with other sources connected thereto. Inasmuch as gating pulses are supplied to the control electrodes of devices 87 and 88, these devices are simultaneously switched from a conductive to a non-conductive condition in response to the gating pulses.

The amplified input wave developed in the anode circuit of the input amplifier 12 is applied through an isolating resistor 92 to the control electrode of the device 87. The isolating resistor 92 preferably has a value similar to that of isolating resistors 85 and 86 so as to preserve the bias conditions on the devices 87, 88 of the balanced gating circuit and to prevent interaction between the interconnected circuits. Inasmuch as the device 87 conducts only for the time duration of the gating pulse supplied thereto, there is produced across the common cathode resistor 89 only that portion of the continuous input wave which occurs during the gating interval.

If the tubes 87 and 88 draw equal currents through the common cathode resistor 89, substantially no voltage variations will be produced across the common cathode resistor as a result of tube switching inasmuch as the voltage produced across the resistor 89 due to the flow of current through either tube will remain the same. In order to prevent the gating pulses from appearing across the common cathode output resistor, means are provided for equalizing the currents drawn by the devices 87 and 88. In the circuit of Fig. 2, such means comprise a potentiometer 93 connected in series between the anode and control electrode of device 88. Inasmuch as the potentiometer 93 is connected to a positive source of potential through a common decoupling resistor for the tubes 87 and 88, the current drawn by device 88 when that device is in a conductive state may be varied by adjusting the potentiometer 93. With this arrangement, the base line of the signal produced across resistor 89 remains substantially undisturbed during the interval between gating cycles and the gating pulses themselves do not appear across the output resistor 89. The test signal produced across the output of balanced gate circuit 17 is applied through a capacitor 94 to a contact 95 of the selector switch 11. When this switch is in its uppermost position, the test signal is applied through the arm 96, a resistor 97 and the potentiometer 98 to the control electrode of an electron discharge device 99.

In the ideal situation, the test signal would comprise a straight time base line broken only for the duration of the superimposed single cycle of the incoming wave. However, during the leading and trailing edge intervals of the gating pulses supplied to the balanced gate circuit 17, small transient voltages are produced across the common cathode resistor due to lack of exact symmetry in the rise and fall of the gating pulses applied to the two control electrodes of the circuit. To remove switching transients which may appear across the cathode resistor 89, a multi-section filter circuit is provided the individual sections of which provide progressively greater filtering action. Any particular section may be selectively employed to filter out the relatively high frequencies which make up the switching transients. In the illustrated embodiment, the filter circuit is indicated as an integration circuit comprising a resistor 97 and a plurality of capacitors 100. The capacitors 100, which may vary in capacity from a value of 100 micromicrofarads to a value of 3,000 micromicrofarads are selectively connected across the potentiometer 98 by means of a step switch indicated generally at 101. With this arrangement the filter section may be selected which minimizes the switching transients while producing a minimum of rounding off of the selected sine wave. In this connection, it will be understood that selection of too large a capacitor produces too much integration and hence the high frequency components contained in the abrupt change from base line to sinusoidal wave are removed and the end portions of the selected cycle are rounded off.

By providing the described conductive or D. C. coupling between the gating pulse trigger circuit 15, the clipper amplifier circuit 16 and the balanced gate circuit 17, low frequency phenomena, in the order of 10 cycles per second, may be supplied to the electronic wave chopping circuit and may be utilized to control the gating pulse trigger circuit. Also, the provision of direct coupling between the above described circuits eliminates any time constants which would tend to charge up and round off the sharp leading and trailing edges of the gating pulses. By providing steep sloped gating pulses, the switching transients which arise during the gating operation due to imperfect symmetry between the oppositely sensed pulses are of relatively high frequency. As a consequence, the switching transients which are of relatively high frequency can be removed, by filtering action, from a relatively low frequency input wave without materially affecting the selected portion of the input wave.

The test signal, which comprises a single selected cycle of the continuous wave is thus supplied to the control electrode of amplifying device 99 wherein it is amplified and supplied through a coupling capacitor 105 to the control electrode of a pentode type electron discharge device 106. To effect linear amplification through the devices 105 and 106 and also to provide increased amplification for a low frequency input wave, there is provided a feed back network from the anode of the device 106 to the input circuit of the device 99. Specifically, the feed back circuit comprises a capacitor 107 and resistor 108, which are connected in series from the anode of the device 106 to the cathode of the device 99, and an unbypassed cathode resistor 109 connected between the cathode of device 99 and ground. With this arrangement, amplified signals appearing in the anode circuit of the device 106 are fed back to the cathode circuit of the device 99 in such phase as to oppose changes in the input voltage. This degenerative feed back voltage stabilizes the final amplifier circuit and provides linear amplifications at relatively low frequencies, as will be readily apparent to those skilled in the art. The device 106 is also provided with an unbypassed cathode resistor 110 in order further to linearize the amplification therein. The amplified test signal produced at the anode of the device 106 is applied through a coupling capacitor 111 to the output terminals 112, 113 of the electronic wave chopping circuit.

In the preceding discussion it has been assumed that the gate pulse trigger circuit 15 is normally biased for control by successive negative control pulses from the differentiating circuit 14. In the event that a single cycle of the continuous electrical wave is to be selected, and also in the event that a particular $n$th cycle of the continuous wave is to be selected, there is provided a biasing trigger circuit which controls the gating pulse trigger circuit in such a manner that the circuit is disabled except during periods when the biasing trigger circuit is turned on. More specifically, the biasing trigger circuit comprises a pair of electron discharge devices 115 and 116 the cathodes of which are connected to ground and the anode circuits of which are cross connected through RC networks 117, 118 to the control electrodes of the opposite devices. The control electrodes of the devices 115, 116 are connected through grid bias resistors 119, 120 to the negative terminal of a unidirectional source of potential. The anode of the device 115 is connected through a variable resistor 121 to the normally nonconducting device 67 of the gating pulse trigger circuit 15. The bias voltage for the device 67 is thus determined in part by the bleeder network comprising resistors 71, 72 and 73 and is also determined by the variable resistor 121 and the anode load resistor 122 of the device 115. Thus when the device 115 is in a conductive state, that is, when the biasing trigger circuit is in its so-called turned off condition, the flow of anode current through the resistor 122 produces a potential drop thereacross so that the anode of device 15 and correspondingly the control electrode of device 67 is at a negative potential, thus increasing the bias voltage which must be overcome to control the gating pulse trigger circuit.

To turn on the biasing trigger circuit, there is provided a starting circuit, which may be closed by the operator of the device, and which supplies a positive voltage to the control electrode of the device 116. Closure of the switch circuit 27 thus causes the device 116 to be placed in a conductive state with the result that the device 115 is rendered non-conductive. When the device 115 is rendered non-conductive the anode voltage thereof rises, causing the bias voltage at the control electrode of the gating pulse trigger circuit to rise by a proportional amount. Thus, actuation of the manual start switch 27 produces a bias voltage change which conditions the circuit 15 for control by the control pulses supplied thereto. The amplitude of the bias voltage supplied by the biasing circuit 23 may be varied by adjusting the resistor 121 to a point where the control electrode bias on device 67 is too great to allow conduction of that device. The negative control pulse immediately following the leading edge of the step bias wave produced by the biasing circuit thus operates to turn off the device 68 and, through the network 73, simultaneous to turn on the device 67. The next succeeding control pulse causes a corresponding switching on and off of the devices 67 and 68, device 68 being switched to a conductive state.

In order to turn off the biasing trigger circuit at the end of the produced gating pulses so that a single cycle of the continuous wave is selected, there is provided a feedback circuit from device 68 to device 116. Specifically, the feedback circuit comprises a capacitor 124 connected from the anode of device 68 to the control electrode of device 116 through the switch 25. The capacitor 124 is preferably of small value so as to differentiate the gating pulse appearing at the anode of the device 68. Differentiation of the gating pulse at the anode of device 68 produces a negative pulse coincident with the trailing edge of the gating pulse, which negative pulse is operative to turn off the biasing trigger circuit. For single cycle operation, the biasing trigger circuit then remains in a disabled state until subsequent actuation of the manual start switch 27, whereupon the enabling and disabling cycle discussed above is repeated.

In the event that a particular *n*th cycle of the continuous wave is to be selected there is provided a variable frequency oscillator, which may be utilized in place of the manual starting switch 27 to turn on the biasing trigger circuit 23 and thus condition the gating pulse trigger circuit for controlled operation. Specifically, the variable frequency oscillator comprises a gaseous discharge device 125, the anode of which is connected through a variable resistor 126 and fixed resistor 127 to the positive terminal of a unidirectional source of potential. The anode of device 125 is also connected through a selector switch 128 and capacitor 129 to ground potential. Additional capacitors 130 of various values may be selected by the switch 128 to provide various operating frequencies for the oscillator. The cathode of the device 125 is connected through an output resistor 131 to ground potential and is also connected through the resistor 132 to +B potential. The oscillator described above comprises a conventional gas tube relaxation oscillator wherein the particular selected capacitor 139 is charged through resistors 126 and 127 towards the positive unidirectional source of potential. When the voltage across the capacitor exceeds the breakdown potential of the gaseous discharge device 125, the device conducts and rapidly discharges the capacitor to a point of sufficiently low potential that the arc discharge between the cathode and anode of the device 125 can no longer be supported. Conduction in device 125 is thus halted and the cycle is repeated. At the instant of conduction of the device 125, there is produced across the cathode resistor 131 a positive pulse, due to the flow of cathode current therethrough (which positive pulse is connected through the selector switch 29 and coupling network 132 to the control electrode of device 116. The positive pulses appearing across the resistor 131 at the operating rate of the variable frequency oscillator thus operate to turn on the biasing trigger circuit in a manner similar to that produced by manual actuation of the starting switch 27. The biasing trigger circuit is again turned off by means of the feedback capacitor 124 in the manner described in connection with the selection of a single cycle of the incoming wave.

In order to synchronize the variable frequency oscillator with the incoming continuous wave so that the same fixed portion of the continuous wave may be selected, there is provided a coupling resistor 135 which is connected from the anode of device 45 to the control electrode of gaseous discharge device 125, the control electrode being connected to ground through a grid leak resistor 136. With this arrangement, the positive portions of the amplified continuous wave appearing at the anode of the device 45 are utilized to control the firing of device 125 and hence the timing of the positive control pulses which appear across the cathode resistor 131. Relatively large changes in the frequency of the oscillator may be obtained by selecting various ones of the discharge capacitors 130 associated with the anode circuit of device 125, it being understood that the input wave pulls the oscillator into synchronism therewith so that the oscillator frequency varies in steps rather than continuously. Adjustment of the frequency of the oscillator in between the steps afforded by capacitors 130 is provided by variation of the charging resistor 126 which operates to vary the charging rate of the particular selected capacitor and hence the time at which the gaseous device 125 breaks down. It will be understood that the incoming wave supplied to the control electrode of the device 125 continuously synchronizes the oscillator, although the frequency of the oscillator may be varied over a relatively wide range inasmuch as the oscillator is operated at a frequency substantially below that of the continuous wave supplied to the input terminals of the circuit.

To provide for the introduction of auxiliary signals, such as chopped speech, or the like, during the chopped out portions of the continuous wave, the balanced gate circuit 17 is provided with an input circuit comprising an input terminal 140, a coupling capacitor 141 and an isolating resistor 142 which are connected in series to the control electrode of device 88. In this connection it will be understood that the amplified input wave is supplied to the control electrode of the device 87 and a portion or portions of the wave are passed to the common cathode circuit 89 depending upon the particular operation of the gating pulse trigger circuit and the biasing trigger circuit. By providing the auxiliary input circuit discussed above, other signals, such as noise voltages or a speech wave train, may be supplied to the gating circuit in such a manner that the portion of the auxiliary signal which occurs between the selected cycles of the incoming wave 10 are mixed with the selected cycles of the incoming wave in the cathode circuit 89 and supplied through the final amplifier and filter 20 to the equipment under test. Such an arrangement is particularly suitable for use in checking the operation of the equipment when subjected to chopped speech. In such case, the speech wave train is connected directly to the auxiliary terminal 140 and portions of the speech wave train which occur between the selected cycles of the sinusoidal wave 10 are also supplied to the equipment.

Figure 4A:
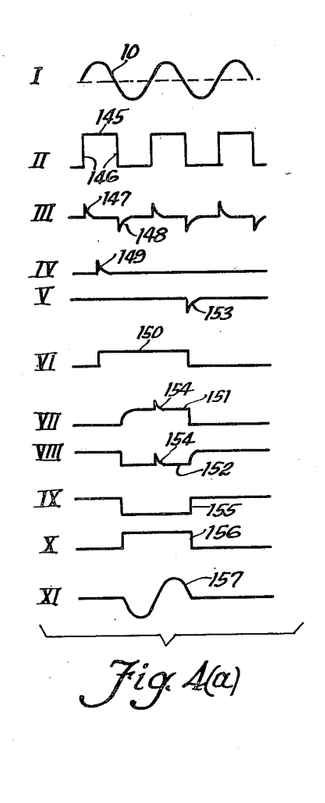
Figs. 4(a)–4(d) are timing diagrams illustrating wave forms which occur in certain portions of the circuit of Fig. 2.

In order to visualize more clearly the operation of the above-described system and the particular wave forms produced therein, reference is now had to Figs. 4(a)–4(d) wherein there are illustrated timing diagrams of particular portions of the circuit of Fig. 2. In Fig. 4(a) there is illustrated the timing wave forms which are produced in the circuit of Fig. 2 when the selector switches 25 and 27 are closed, that is, the operation which obtains when a single cycle of the continuous wave is selected. Referring to Fig. 4(a), there is illustrated in timing diagram I several cycles of the sinusoidal input wave 10. Timing diagram II shows the rectangular shaped output wave 145 produced in the output of the squaring circuit 13, the leading and trailing edges 146 of the wave 145 being illustrated as occurring at the zero, or crossover, points of the sinusoidal wave 10. Timing diagram III illustrates the output of the differentiating circut 14 and comprises positive control pulses 147, which are derived from the leading edges of the rectangular wave 145, and negative control pulses 148 which are derived from the trailing edges of the wave 145.

In timing diagram IV of Fig. 4(a), there is shown the positive control pulse 149 which is produced upon actuation of starting switch 27. In this connection it will be understood that the pulse 149 may occur at any time as it is dependent upon manual actuation of switch 27. The positive control pulse 149 initiates a step function bias wave 150 which is produced by the biasing trigger circuit 23 and which is illustrated in timing diagram VI. The amplitude of the bias wave 150 is made sufficient to condition the gating pulse trigger circuit for control by the next succeeding negative control pulse of timing diagram III. The gating pulse trigger circuit is turned on by the first negative control pulse which occurs after initiation of the bias wave 150, that is, the negative control pulse 148 of timing diagram III. The gating pulse trigger circuit is turned off by the next succeeding negative control pulse so as to provide a positive gating pulse 151 and a negative gating pulse 152 as illustrated in timing diagrams VII and VIII, respectively. With the selector switch 25 in a closed position the trailing edge of the gating pulse 151 is differentiated by capacitor 124 to produce a negative feedback pulse 153, illustrated in timing diagram V. The feedback pulse 153 turns off the biasing trigger circuit thus causing termination of the step function bias wave 150 illustrated immediately therebelow in timing diagram VI.

As illustrated in diagrams VII and VIII, the corners of the gating pulses 151 and 152 are considerably rounded off due to the capacity associated with the anode circuits of the gating pulse trigger circuits. Also, pulses 154 corresponding to the positive control pulses 147, pass through the gating pulse trigger circuit and appear superimposed upon the central portion of the gating pulses 151 and 152. However, the clipper amplifier 16 operates to sharpen the leading and trailing edges of the pulses 151 and 152 and also to remove the undesired positive pulses 154 as has been discussed in detail heretofore. The gating pulses from the output circuit of the clipper amplifier 16 thus appear as oppositely sensed rectangular pulses 155, 156, shown respectively in timing diagrams IX and X which gating pulses are substantially mirror images of one another so as to provide relatively small switching transients in the balanced gate circuit 17. The selected portion of the input wave 10 which occurs during the gating interval of pulses 155, 156 is illustrated in timing diagram XI as the single cycle 157 of the sinusoidal input wave 10.

Figure 4B:
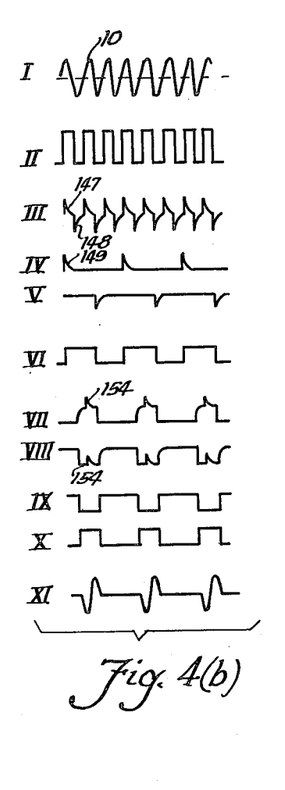
Figure 4C:
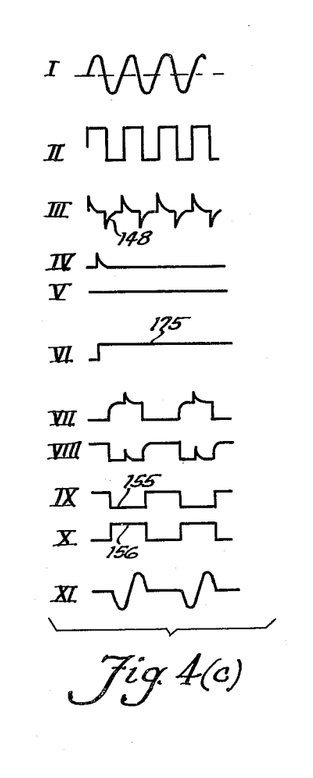
Figure 4D:
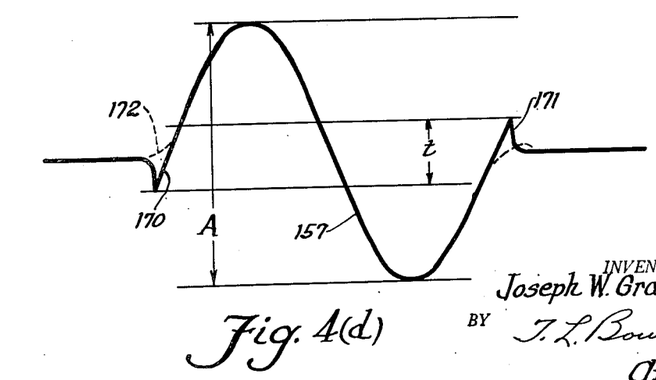

In order properly to understand the operation of the step switch filter circuit of Fig. 2 in removing the unavoidable switching transients producing during the gating of the continuous wave, reference is now had to Fig. 4(d) wherein a representative test signal is illustrated in more detail. In Fig. 4(d) the single selected cycle 157 is illustrated as having a peak to peak amplitude A. The switching transients which occur during the leading and trailing edge intervals of the gating pulses are at 170 and 171 respectively. The peak to peak amplitude of the undesired switching transients 170, 171 is shown at $t$ in Fig. 4(d). The percent of extraneous transients produced in the test signal is thus equal to $$t/A \times 100$$

To utilize the test signal 157 in analyzing the transient response of a particular equipment it is necessary to reduce the extraneous transients produced by the gating circuit 17 to a value considerably smaller than that which can be detected by a conventional oscilloscope connected to the output of the equipment being tested. Otherwise, the operator cannot evaluate the response of the equipment under test as he cannot separate the transient response of the equipment under test from the transients already existing in the test signal supplied thereto. In actual practice, it has been found that a reduction of the extraneous transients in the test signal to about 3 per cent of the peak to peak amplitude of the test signal is satisfactory to permit use of the test signal in analyzing transient response. Therefore, to obtain the necessary reduction in extraneous transients, the low pass filter circuit of Fig. 2 is employed. The amount of high frequency attenuation, and hence reduction of the relatively high frequency transients, is dependent upon the particular section of the filter employed. If too large a capacitor 100 (Fig. 2) is utilized the corners at the beginning and end of the selected cycle are rounded off as illustrated by the dotted line 172 in Fig. 4(d). On the other hand, if too little filtering is used the switching transients are still detectable on an oscilloscope. Optimum filtering exists at a point intermediate the extreme conditions of excessive rounding off, as at 172 and excessive transients as at 170 in Fig. 4(d), and may be obtained by selective adjustment of the filter network.

In Fig. 4(b) there is illustrated the timing wave forms which occur in the electronic wave chopping circuit of Fig. 1 when the variable frequency oscillator 28 is employed to control the biasing trigger circuit 23. For such operation the switches 25 and 29 are closed and the switch 27 is opened. In Fig. 4(b) the same reference numerals as shown in Fig. 4(a) are employed to identify the timing wave forms associated with the various portions of the circuit. In Fig. 4(b), the continuous wave supplied to the input circuit of the equipment is shown as a sinusoidal wave 10, there being a greater number of cycles thereof illustrated to indicate the selection of every $n$th cycle thereof. Inasmuch as the oscillator 23 is operated at a lower frequency than the incoming wave, starting pulses 149, illustrated in timing diagram IV, occur at a substantially lower frequency than the differentiated control pulses 147, 148 and in synchronism therewith. With the set of conditions illustrated in Fig. 4(b), the oscillator, which produces the positive starting pulses 149 supplied to the biasing trigger circuit, is operated at one-third the frequency of the continuous input wave 10 so that every third cycle of the continuous wave is produced in the output circuit of the final amplifier, as illustrated in timing diagram XI. It is evident that the positive pulses 154, which are again passed by the gating pulse trigger circuit, are removed in the clipper amplifier circuit so that a faithful reproduction of selected single cycles of the continuous wave is obtained in the output circuit of the electronic wave chopping system.

In the event that alternate cycles of the continuous waves are to be selected in the output circuit of the wave chopping system the operation illustrated in Fig. 4(c) may be provided. Such operation obtains when switch 27 is closed to initiate a step function of bias voltage, switches 25 and 29 being open for this type of operation. Due to the fact that feedback connection from the gating pulse trigger circuit to the bias trigger circuit is opened for alternate cycle operation, the bias voltage from the biasing trigger circuit remains at maximum amplitude as illustrated at 175, and hence the gating pulse trigger circuit continues to be turned on and off by successive negative control pulses 148 so that gating pulses 155, 156, occurring at one-half the frequency of the continuous input wave, are supplied to the balanced gate circuit 17.

Figure 3:
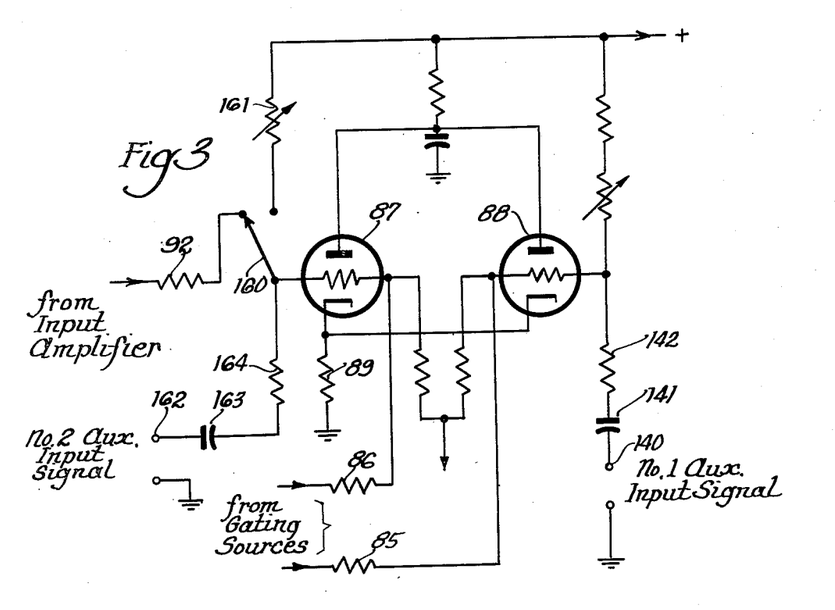
Fig. 3 is a schematic diagram of an alternative embodiment of a portion of the circuit of Fig. 2.

In the event that the electronic wave chopping circuit is to be utilized for other applications, as, for example, to compare portions of two or more waves to obtain the frequency response of electrical equipment to both of such waves, modification of the balanced gating circuit 17 may be made in the manner illustrated in Fig. 3. In Fig. 3 certain elements of the balanced circuit discussed in connection with Fig. 2 remain the same and a detailed description thereof is considered unnecessary herein. For purposes of clarification, identical reference numerals for circuit elements common to both Figs. 2 and 3 have been employed. In Fig. 3 the gating pulses from the clipper amplifier circuit are again supplied through isolating resistors 85, 86 to the control electrodes of the devices 87, 88. The input wave from amplifier 12 (Fig. 1) is illustrated as being connected to the control electrode of device 87 through a resistor 92 and a selector switch 160. In addition to the auxiliary input circuit associated with the control electrode of device 88, there is provided in Fig. 3 a second auxiliary input circuit comprising an input terminal 162, coupling capacitor 163 and an isolating resistor 164, which elements are connected in series to the control electrode of device 87.

In the event that the input wave from the amplifier 10 is not supplied to the control electrode of device 87, the switch 160 is utilized to connect a variable balancing resistor 161 from a positive source of potential to the control electrode of device 87. When the resistor 92 is removed the D. C. balance of the gating circuit is upset due to the fact that the resistor 92 is directly connected to the positive source of potential through the anode load impedance of device 45. However, the resistor 161 may be varied to rebalance the gating circuit 17 so that the devices 87, 88 thereof draw equal currents when in a conductive state.

When the modified gating circuit shown in Fig. 3 is employed in the electronic wave chopping circuit of Fig. 2, a versatile circuit is provided wherein a wide variety of different test signals may be obtained. For example, a first auxiliary signal may be supplied to the first auxiliary input terminal 140 and a second auxiliary signal may be supplied to the second auxiliary input terminal 162 and the wave from input amplifier 12 removed from device 87. The auxiliary signals may comprise any arbitrary waveform having no phase relationship to the incoming wave 10 which controls the gating circuit. With the selector switches 25 and 27 (of Fig. 2) open, and the variable oscillator switch 29 closed a fixed portion of the auxiliary signal supplied to the terminal 162 is intermixed with a variable portion of the auxiliary signal supplied to the terminal 140, the intermixed selected portions appearing across output resistor 89. By such an arrangement a simulated multiplexing signal is provided whereby the equipment under test may be analyzed for simultaneous response to chopped portions of two independent wave trains. It will be understood that the above example of the type of test signal obtainable from the electronic wave chopping circuit is given only by way of illustration, and that many other types of test signals may be obtained as will be readily apparent to those skilled in the art.

While the electronic wave chopping circuit of Fig. 2 is specifically arranged to select particular portions of a continuous wave of relatively low frequency, it will be understood that the frequency range of the wave chopping circuit of Fig. 2 may be substantially increased. For example, pentode type electron discharge devices may be utilized in place of the triode devices shown in Fig. 2 for the gating pulse trigger circuit, clipper amplifier circuit and the balanced gate circuit. By employing pentode type devices having relatively high gain, the switching transients occuring during the leading and trailing edges of the gating pulses are of substantially higher frequency and may be removed by relatively slight filtering action thus permitting the use of a relatively high frequency input wave.

While there have been described what are at present considered to be the preferred embodiments of the invention, it will be understood that various modifications may be made therein which are within the true spirit and scope of the invention as defined in the appended claims.

I claim:

1. An electronic wave chopper comprising, a periodic wave source, means for deriving from said source a gating pulse having a time duration equal to a predetermined discrete time interval of said periodic wave, and signal transmission gating means controlled by said gating pulse for selecting a predetermined portion of said periodic wave.

2. An electronic wave chopper comprising, a periodic wave source, means for deriving from said source a pair of gating pulses of opposite senses and of a time duration equal to one cycle of said periodic wave, and signal transmission gating means controlled by said oppositely sensed gating pulses to gate one or more signals during the persistence interval of said gating pulses.

3. An electronic wave chopper comprising, a periodic wave source, a normally closed gate circuit adapted when open to transmit therethrough a periodic wave from said source, means for deriving from said source control pulses indicative of a predetermined discrete time interval of said periodic wave, and means controlled by said control pulses for opening said gate circuit during said time interval, thereby to select a predetermined portion of said periodic wave.

4. An electronic wave chopper comprising, a continuous periodic wave source, means for selectively deriving from said source pairs of oppositely sensed gating pulses having a time duration equal to one cycle of said periodic wave and having a recurrence rate equal to a sub multiple of the periodicity of said periodic wave, and means controlled by said pairs of oppositely sensed gating pulses for selecting that portion of said wave which occurs during the persistence interval of said gating pulses.

5. An electronic wave chopper comprising, a continuous periodic wave source, means for deriving from said source oppositely sensed gating pulses having a time duration equal to one cycle of said periodic wave, said last named means including selectively operable means for controlling the time of occurrence of said gating pulses, and means controlled by said gating pulses for selecting that portion of said wave which occurs during the persistence interval of said gating pulses.

6. An electronic wave chopper comprising, a continuous periodic wave source, means for deriving from said source oppositely sensed gating pulses having a time duration equal to one cycle of said periodic wave, selectively operable means for controlling said gating pulse, means to determine the time of occurrence of said pulses, and means controlled by said gating pulses for selecting that portion of said wave which occurs during the persistence interval of said gating pulses.

7. An electronic wave chopper comprising, a periodic wave source, trigger circuit means for deriving from said source a pair of gating pulses of opposite senses and of a time duration equal to one cycle of said periodic wave, means controlled by said pair of oppositely sensed gating pulses for selecting that portion of said wave which occurs during the persistence interval of said gating pulses, and means for shifting the phase of said gating pulses relative to said periodic wave, thereby to vary the selected portion of said wave.

8. An electronic wave chopper comprising, a periodic wave source, trigger circuit means for deriving from said source a pair of gating pulses of opposite senses and of a time duration equal to one cycle of said periodic wave, means utilizing said pair of oppositely sensed gating pulses for selecting that portion of said wave which occurs during the time duration of said gating pulses, and filtering means connected to said selecting means for suppressing switching transients which occur during the leading and trailing edge intervals of said gating pulses while passing substantially unchanged the selected portion of said periodic wave.

9. An electronic wave chopper comprising, a periodic wave source, means for deriving from said source pairs of oppositely sensed gating pulses, each of said pulses corresponding in time to alternate cycles of said periodic wave and having a time duration equal to one cycle thereof, and means utilizing said pairs of oppositely sensed pulses for selecting those portions of said periodic wave which occur during said time duration.

10. An electronic wave chopper comprising, a periodic wave source, trigger circuit means for deriving from said source pairs of oppositely sensed gating pulses, each of said pulses corresponding in time to alternate cycles of said periodic wave and having a time duration equal to one cycle thereof, means utilizing said pairs of oppositely sensed pulses for selecting those portions of said periodic wave which occur during said time duration, and means for shifting the phase of said pairs of pulses relative to said periodic wave thereby to control the starting point of the selected portions of said wave.

11. An electronic wave chopper comprising, a periodic wave source, trigger circuit means for deriving from said source pairs of oppositely sensed gating pulses, each of said pulses corresponding in time to alternate cycles of said periodic wave and having a time duration equal to one cycle thereof, means utilizing said pairs of oppositely sensed pulses for selecting those portions of said periodic wave which occur during said time duration, and filtering means connected to said selecting means for suppressing switching transients which occur during the leading and trailing edge intervals of said gating pulses while passing substantially unchanged the selected portion of said periodic wave.

12. An electronic wave chopper comprising, a source of periodic voltage, means for deriving from said source control pulses of a given polarity and of the same frequency as said periodic voltage, a trigger circuit arranged to be turned on by a first one of said control pulses and turned off by the next succeeding control pulse, means for deriving from said trigger circuit a pair of gating pulses of opposite senses, balanced gating means controlled by said gating pulses for selecting that portion of said periodic voltage which occurs during said gating pulses, and means for integrating the output of said balanced gating means thereby substantially to reduce switching transients which occur during the leading and trailing edge intervals of said gating pulses.

13. An electronic wave chopper comprising a source of periodic voltage, means for deriving from said source control pulses of a given polarity and of the same frequency as said periodic voltage, a trigger circuit arranged to be turned on by a first one of said control pulses and turned off by the next succeeding control pulse, means for deriving from said trigger circuit a pair of gating pulses of opposite senses, balanced gating means controlled by said gating pulses for selecting that portion of said periodic voltage which occurs during said gating pulses, and means for shifting the phase of said control pulses relative to said periodic voltage to select a predetermined portion of said periodic voltage.

14. An electronic wave chopper comprising, a periodic wave source, means for deriving from said source control pulses of a given polarity and of a frequency equal to said periodic wave, a trigger circuit arranged to be turned on by a first one of said control pulses and turned off by the next succeeding control pulse, a relaxation oscillator arranged to provide an output wave of substantially lower frequency than said wave and in synchronism therewith, means utilizing said output wave for disabling said trigger circuit for a predetermined number of successive cycles of said periodic wave, means for deriving from said trigger circuit pairs of oppositely sensed gating pulses having a time duration equal to one cycle of said periodic wave and having a frequency of occurrence equal to said output wave, and balanced gating means controlled by said gating pulses for selecting those portions of said periodic wave which occur during said time duration.

15. An electronic wave chopper comprising, a periodic wave source, means for deriving from said source control pulses of a given polarity and of a frequency equal to said periodic wave, a trigger circuit arranged to be turned on by a first one of said control pulses and turned off by the next succeeding control pulse, a relaxation oscillator arranged to provide an output wave of substantially lower frequency than said wave and in synchronism therewith, means utilizing said output wave for disabling said trigger circuit for a predetermined number of successive cycles of said periodic wave, means for deriving from said trigger circuit pairs of oppositely sensed gating pulses having a time duration equal to one cycle of said periodic wave and having a frequency of occurrence equal to said output wave, balanced gating means controlled by said gating pulses for selecting those portions of said periodic wave which occur during said time duration, and means for shifting the phase of said control pulses relative to said periodic wave thereby to vary the portions of said periodic wave selected by said balanced gating means.

16. An electronic wave chopper comprising, a periodic wave source, means for deriving from said source control pulses of a given polarity and of a frequency equal to said periodic wave, a trigger circuit arranged to be turned on by a first one of said control pulses and turned off by the next succeeding control pulse, a relaxation oscillator arranged to provide an output wave of substantially lower frequency than said wave and in synchronism therewith, means utilizing said output wave for disabling said trigger circuit for a predetermined number of successive cycles of said periodic wave, means for deriving from said trigger circuit pairs of oppositely sensed gating pulses having a time duration equal to one cycle of said periodic wave and having a frequency of occurrence equal to said output wave, balanced gating means controlled by said gating pulses for selecting those portions of said periodic wave which occur during said time duration, means for shifting the phase of said control pulses relative to said periodic wave thereby to vary the portions of said periodic wave selected by said balanced gating means, and means for integrating the output of said balanced gating means to remove switching transients which occur during the leading and trailing edge intervals of said gating pulses without materially affecting the selected portions of said periodic wave.

17. An electronic wave chopper, a periodic wave source, means for deriving from said source a pair of oppositely sensed gating pulses having a time duration equal to one cycle of said periodic wave and having a frequency equal to that of said periodic wave, and balanced gating means for selecting that portion of said wave which occurs during said gating pulses, said last named means comprising a pair of electron discharge devices, a common impedance connecting the cathodes of said devices to ground, means for turning on and off said devices in accordance with said gating pulses, means connecting said periodic wave to one of said devices, means for equalizing the voltage developed across said impedance by each device during the turned on period thereof, and means for deriving from said impedance the selected portion of said wave.

18. An electronic wave chopper, a periodic wave source, means for deriving from said source a pair of oppositely sensed gating pulses having a time duration equal to one cycle of said periodic wave and having a frequency equal to that of said periodic wave, and balanced gating means for selecting that portion of said wave which occurs during said gating pulses, said last named means comprising a pair of electron discharge devices, a common impedance connecting the cathodes of said devices to ground, means for turning on and off said devices in accordance with said gating pulses, means connecting said periodic wave to one of said devices, means for equalizing the voltage developed across said impedance by each device during the turned on period thereof, means for deriving from said impedance the selected portion of said wave, and variable integration means connected to the output of said balanced gating means for removing transients which occur during the leading and trailing edge intervals of said gating pulses without materially affecting the selected portions of said periodic wave.

19. An electronic wave chopper comprising, a periodic wave source, means for deriving from said source a square wave having the same frequency as said periodic wave, means for shifting the phase of said square wave relative to said periodic wave, means for differentiating said square wave to obtain control pulses of a given polarity, a gating pulse trigger circuit arranged to be turned on by a first one of said control pulses and turned off by the next succeeding control pulse, manually responsive means for controlling the bias of said trigger circuit to condition said trigger circuit for actuation by said control pulses, means for deriving from said gating pulse trigger circuit a pair of oppositely sensed gating pulses, said gating pulses having a time duration equal to one cycle of said periodic wave, a feedback connection between said trigger circuit and said bias controlling means thereby to disable said bias controlling means at the end of said gating pulses, balanced gating means controlled by said gating pulses for selecting that portion of said periodic wave which occurs during said gating pulses, and variable integration means connected to the output of said balanced gating means for reducing transients which occur during the leading and trailing edge intervals of said gating pulses.

20. An electronic wave chopper comprising, a periodic wave source, means for deriving from said source a square wave of the same frequency as said periodic wave, means for shifting the phase of said square wave relative to said periodic wave, means for differentiating said square wave to obtain control pulses of a given polarity, a gating pulse trigger circuit arranged to be turned on by a first one of said control pulses and turned off by the next succeeding control pulse, a variable frequency oscillator operating at a frequency substantially lower than said periodic wave, means for synchronizing said oscillator with said periodic wave, a biasing trigger circuit arranged to provide bias voltage for said gating pulse trigger circuit to condition said gating pulse trigger circuit for actuation by said control pulses, means including a connection between said oscillator and said biasing trigger circuit for turning on said biasing trigger circuit, a feedback connection from said gating pulse trigger circuit to said biasing trigger circuit for turning off said biasing trigger circuit, means for deriving from said gating pulse trigger circuit pairs of oppositely sensed gating pulses, said pulses having a time duration equal to one cycle of said periodic wave and having a frequency equal to the frequency of said oscillator, balanced gating means controlled by said gating pulses for selecting that portion of said periodic wave which occurs during said gating pulses, and variable integration means connected to the output of said balanced gating means for reducing transients which occur during the leading and trailing edge intervals of said gating pulses.

21. An electronic wave chopper comprising, a periodic wave source, means for deriving from said source a square wave having the same frequency as said periodic wave, means for shifting the phase of said square wave relative to said periodic wave, means for differentiating said square wave to obtain control pulses of a given polarity, a gating pulse trigger circuit arranged to be turned on by a first one of said control pulses and turned off by the next succeeding control pulse, a biasing trigger circuit, means connecting the output of said biasing trigger circuit, to said gating pulse trigger circuit to condition said gating pulse trigger circuit for control by said control pulses when said biasing trigger circuit is turned on, manually responsive means for turning on said biasing trigger circuit, means for deriving from said gating pulse trigger circuit pairs of gating pulses of opposite senses, said pulses having a time duration equal to one cycle of said periodic wave and having a frequency equal to one half the frequency of said wave, balanced gating means controlled by said gating pulses for selecting those portions of said periodic wave which occur during said gating pulses, and variable integration means connected to the output of said balanced gating means for reducing transients which occur during the leading and trailing edge intervals of said gating pulses.

JOSEPH W. GRATIAN.

REFERENCES CITED

The following references are of record in the file of this patent:

UNITED STATES PATENTS

| Number | Name | Date |
| --- | --- | --- |
| 2,399,135 | Miller et al. | Apr. 23, 1946 |